(12) United States Patent
Schroter

(10) Patent No.: US 7,453,397 B2
(45) Date of Patent: Nov. 18, 2008

(54) SYSTEM CONTROLLABLE BY AN EXTERNAL MICROCONTROLLER VIA AN INTERFACE

(75) Inventor: Hartmut Schroter, Brieselang (DE)

(73) Assignee: Cinterion Wireless Modules GmbH, Munich (DE)

(*) Notice: Subject to any disclaimer, the term of this patent is extended or adjusted under 35 U.S.C. 154(b) by 23 days.

(21) Appl. No.: 11/425,864

(22) Filed: Jun. 22, 2006

(65) Prior Publication Data
US 2007/0296628 A1     Dec. 27, 2007

(51) Int. Cl.
*G01S 5/14* (2006.01)
(52) U.S. Cl. ................................. 342/357.1
(58) Field of Classification Search ............ None
See application file for complete search history.

(56) References Cited

U.S. PATENT DOCUMENTS

| | | | | |
|---|---|---|---|---|
| 5,418,537 | A | * | 5/1995 | Bird ..................... 342/357.09 |
| 5,422,816 | A | * | 6/1995 | Sprague et al. ............ 455/556.2 |
| 5,519,403 | A | * | 5/1996 | Bickley et al. ................ 342/352 |
| 6,011,510 | A | * | 1/2000 | Yee et al. ................. 342/357.09 |
| 6,222,484 | B1 | * | 4/2001 | Seiple et al. ............. 342/357.09 |
| 6,321,091 | B1 | * | 11/2001 | Holland .................... 455/414.2 |
| 6,593,878 | B2 | * | 7/2003 | Fall ........................... 342/357.1 |
| 6,693,586 | B1 | * | 2/2004 | Walters et al. ........... 342/357.13 |
| 6,748,202 | B2 | * | 6/2004 | Syrjarinne et al. ............ 455/255 |
| 6,751,467 | B1 | | 6/2004 | Cameron et al. |
| 2001/0006892 | A1 | * | 7/2001 | Barnett et al. ................ 455/434 |
| 2001/0014597 | A1 | * | 8/2001 | Takiguchi et al. ............ 455/343 |
| 2002/0029251 | A1 | * | 3/2002 | Ogino et al. ................. 709/217 |
| 2003/0122706 | A1 | * | 7/2003 | Choi et al. ................. 342/357.1 |
| 2004/0167707 | A1 | * | 8/2004 | Bragansa et al. ............. 701/207 |

FOREIGN PATENT DOCUMENTS

| | | |
|---|---|---|
| EP | 1132713 | 9/2001 |
| WO | WO9944186 | 9/1999 |

OTHER PUBLICATIONS

Young, A. et al, "Robust GPS- SMS Communication Channel for the AVL System," Proc. 2003 IEEE Aerospace Conf., vol. 4, Mar. 2003, pp. 1957-1965.*
Telit Wireless Solutions, GM862-GPS, GE863-GPS—GPS AT Commands Set, Apr. 2006, pp. 1-20.*
Sierra Wireless—MP 555 GPS AT Command Reference, Feb. 2006, pp. 1-96.*

* cited by examiner

*Primary Examiner*—Gregory C Issing

(57) ABSTRACT

A system controllable by an external microcontroller via an interface external to the system includes a radio module, and a GPS receiver. The radio module is adapted to 1) pass messages received via the interface to the GPS receiver via an internal interface, and 2) to receive messages from the GPS receiver via an internal interface and pass them further to the external interface.

20 Claims, 3 Drawing Sheets

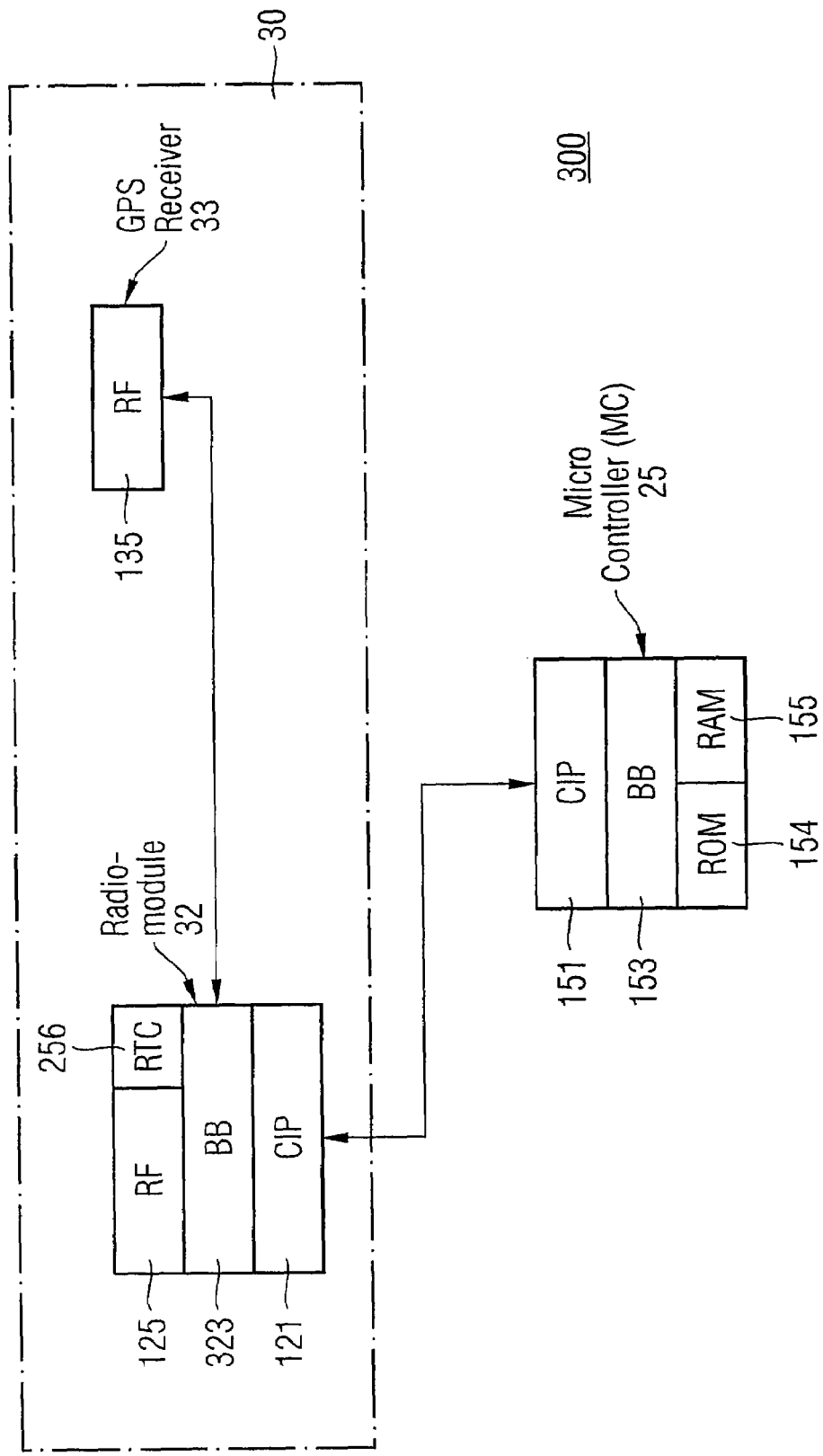

SYSTEM CONTROLLABLE BY AN EXTERNAL MICROCONTROLLER VIA AN INTERFACE

FIELD OF TECHNOLOGY

The present disclosure relates to systems controllable by an external microcontroller via an interface and comprising a radio module and a GPS receiver.

BACKGROUND

FIG. 1 shows a system 100 comprising a subsystem 10 further comprising a radio module 12 and a GPS receiver 13, and a microcontroller 15 for controlling the devices of the subsystem 10. The radio module 12 and the GPS receiver 13 both comprise an interface 121, 131 for command input and data output. Similarly, the microcontroller 15 comprises an interface 151A, 151B for each device of the subsystem 10 for command output and data input.

The microcontroller 15 can be embedded or integrated in or connected to a terminal, for example. If the terminal is to use the radio module 12, it can do so via the microcontroller 15 wherein applications for interfacing the radio module 12 are executed. The radio module 12 comprises a base band unit 123 that is adapted to execute applications for using the radio frequency part 125. The base band unit 123 comprises an internal real time clock 256. Then the necessary communication between the microcontroller 15 and the radio module 12, in order to create a speech or data communication, for example, is carried out between the serial interface 151A in the microcontroller 15 and the serial interface 121 in the radio module 12.

For a satellite positioning functionality, a GPS receiver 13 is connected in a similar manner like the radio module 12, via its serial interface 131 to the other serial interface 151B of the microcontroller 15. The GPS receiver 13 further comprises a radio frequency part 135 and a GPS base band unit 133.

Traditionally, the local data interface of a GPS receiver complies with one of the NMEA standards. NMEA standards NMEA-0180, 0182 and 0183 define electrical interfaces and data protocols for communications between marine instrumentation, for example. These NMEA standards recommend that for a GPS receiver, the interface should comply with RS-232 or EIA-422. In practice, as a consequence, the data connection between a GPS receiver and a device communicating with the GPS receiver requires one data line only and can be carried out using one connector.

The interfaces through which the radio module 12 and of the GPS receiver 13 are controllable by the microcontroller 15 are serial interfaces. For communication, usually the standardized AT command language is used between the microcontroller 15 and the radio module 12. The command language of the GPS receiver 13 is usually the NMEA protocol.

If the device using the system 100 comprising the subsystem 10 and microcontroller 15 needs to use both the radio module 12 and the GPS receiver 13, it would, on its application level, need to process and synchronize data from and to both of these devices. Such a case is encountered, for example, when Assisted GPS is used where a cellular network sends synchronization information, using which the necessary synchronization of the GPS receiver 13 can be performed essentially faster.

The synchronization information is first received from the cellular network by the radio module 12 which then passes it either through the microcontroller 15 to an application running in the terminal or to an application running in the microcontroller 15. The application then in turn passes this information to the GPS receiver 13 through the microcontroller 15.

The synchronization information for a GPS receiver 13 comprises many different kinds of data to enable the GPS receiver 13 to start with the positioning. This information includes in addition to current visibility of satellites also the current date and time. For this reason a real time clock is necessary. A simple GPS receiver 13 nevertheless does not contain an internal real time clock, so the time information has to be available from the microcontroller 15, e.g. from its internal real-time clock 156.

BRIEF SUMMARY

Under the embodiments discussed below, the complexity of microcontroller design and the complexity of design of applications using a satellite positioning system receiver and a radio module are reduced.

By adapting a radio module to pass messages received via an external interface to the satellite positioning system receiver via an internal interface, and to receive messages from the satellite positioning system receiver via an internal interface, and to pass them further to the external interface, the microcontroller can be made simpler because the microcontroller does not need to have an additional interface for the satellite positioning system receiver. This may in turn reduce the complexity of programming devices using the satellite positioning system receiver and the radio module, such as terminals, since they may now use the same interface for sending and receiving messages to and from the satellite positioning system receiver as they use to communicate with the radio module. This is particularly advantageous when the radio module is adapted to work on AT commands (or AT-like commands) and further adapted to pass at least some of the commands in the AT-like command language to the satellite positioning system receiver.

By adapting the satellite positioning system receiver to use the same real time clock as the radio module, the design of the system can also be made easier since the synchronization of two clocks in these devices is not necessary.

Under an exemplary embodiment, a system includes a processing unit adapted to control both the radio module and the satellite positioning system receiver. Design of devices using the system, especially design of a microcontroller and of a terminal using said microcontroller, can be made easier since the number of processors in the system can be reduced. In this way, the controlling of the system or programming of applications can be made easier. Further, costs may be saved because the processing unit can overtake the function of the base band unit of the satellite positioning system receiver, and a separate base band unit can thus be omitted. Furthermore, the processing unit can be adapted to perform the functions necessary for network-assisted satellite positioning. In this manner, information how the network-assisted satellite positioning functionality works does not need to be disclosed to clients any more, because the satellite positioning system receiver does not need to be transparent any more since the functionality can wholly be implemented out in the system.

By adapting the processing unit to control the radio module with a first subset of commands received, and the satellite positioning system receiver with a second subset of commands received, the interfacing can also be made simpler, and even more so if commands in the first subset and in the second subset have a common format. As an example, NMEA commands may be mapped on AT commands.

If the processing unit is adapted to: i) synchronize the activation of the satellite positioning system receiver with that the radio module, or ii) synchronize setting of the satellite positioning system receiver to a standby state with setting of the radio module to a standby state, energy can be saved, especially if the satellite positioning system receiver is to be used as when network-assisted satellite positioning system receiver. For the network-assisted satellite positioning functionality, synchronization information should be received from a cellular network. Therefore, a connection to the network through the radio module is a prerequisite for using the satellite positioning system receiver with the network-assisted satellite positioning functionality.

BRIEF DESCRIPTION OF THE DRAWINGS

The various objects, advantages and novel features of the present disclosure will be more readily apprehended from the following Detailed Description when read in conjunction with the enclosed drawings, in which:

FIG. 3 illustrates another exemplary embodiment, where GPS receiver is directly controlled by a base band unit of the radio module disclosed in FIG. 2.

DETAILED DESCRIPTION

Figure 1:
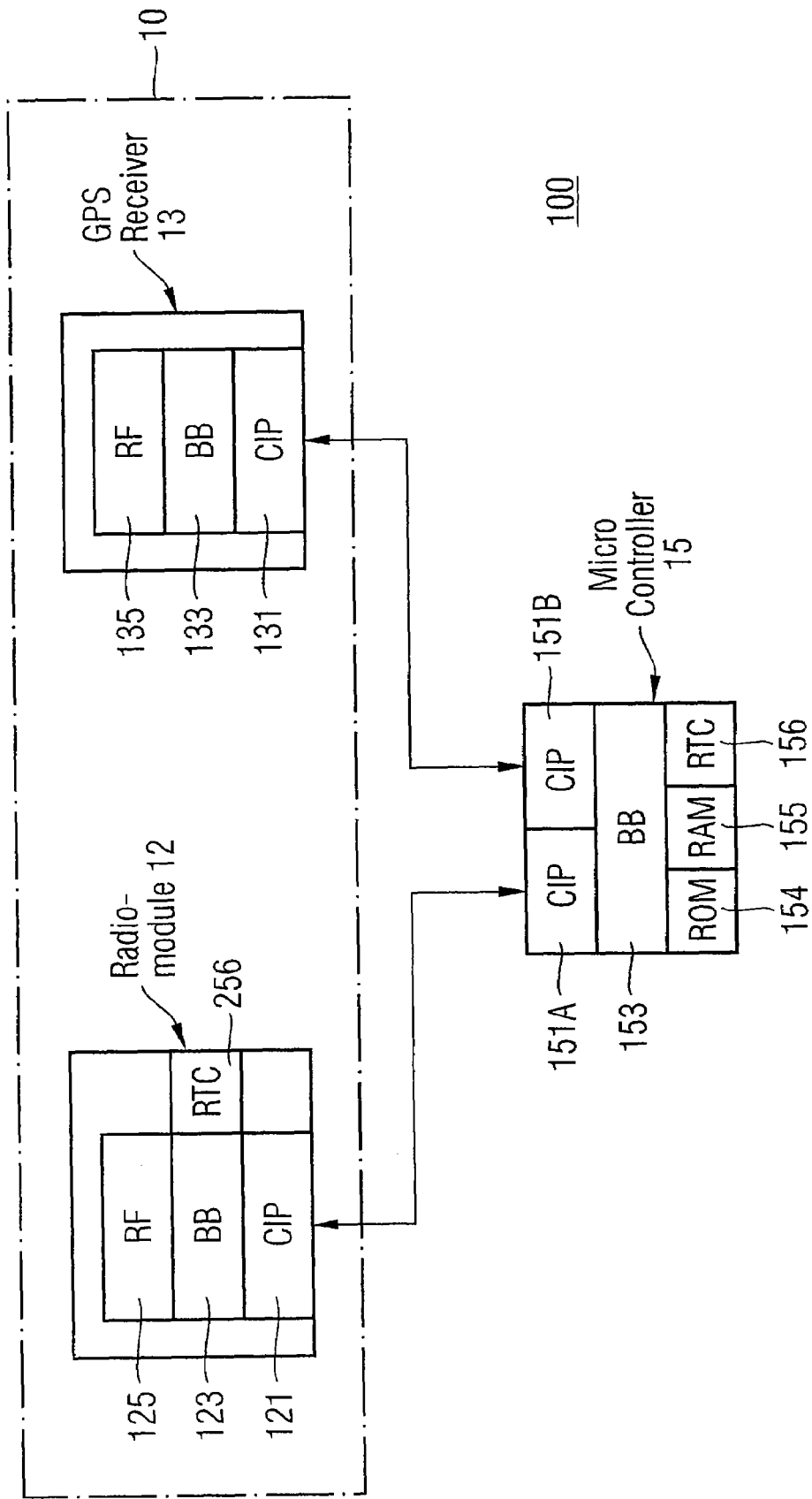
FIG. 1 illustrates a conventional system comprising a radio module and a GPS receiver.
Figure 2:
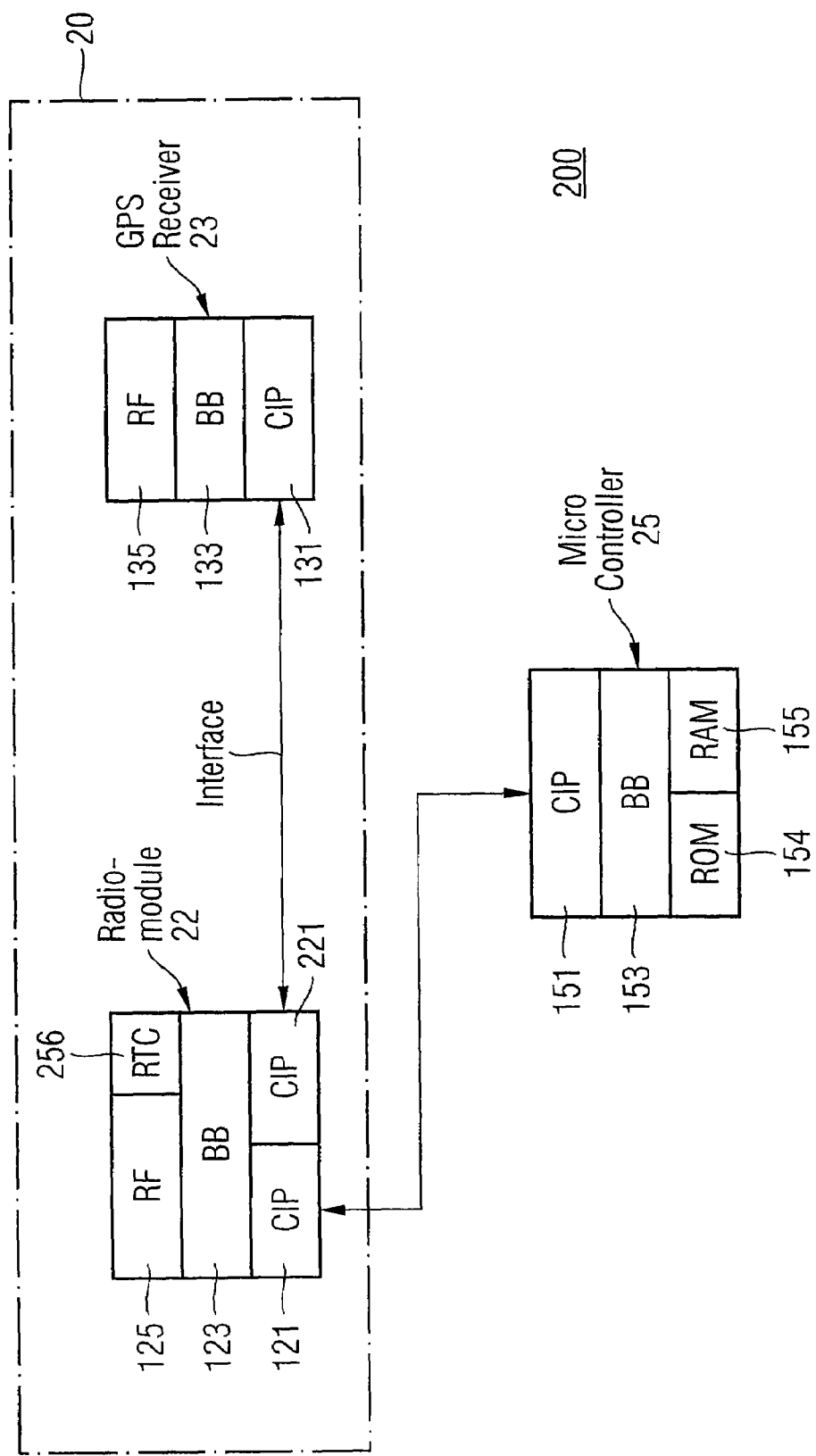
FIG. 2 illustrates an exemplary embodiment that includes a radio module coupled to a microcontroller via an external interface and the radio module communicates with a GPS via an internal interface.

FIG. 2 shows an exemplary embodiment, where radio module 22 preferably comprises an internal interface 221, through which it is connected to an internal interface 131 of the GPS receiver 23. The internal interfaces 131, 221 are preferably serial interfaces.

The radio module 22 may receive data via interface 121 from the microcontroller 25 which passes it to the interface 121 via its interface 151. Both interfaces 121, 151 are preferably serial interfaces.

The radio module 22 acts as master and controls the GPS receiver 23. The controlling is performed in both terms of data and energy balance. This means that the radio module 22 can synchronize the GPS receiver 23 with its own energy saving behavior.

The program code executable in the base band unit 123 of the radio module 22 is capable of initializing the GPS receiver 23 to process data received from the GPS receiver 23 and to send necessary data to it.

Data from a microcontroller 25 to the GPS receiver 23 and from the GPS receiver 23 to the microcontroller 25 is communicated, preferably instead of using the NMEA format, reformulated and provided as AT commands.

Data, such as date and time, that can be used to synchronize the GPS receiver 23, are received by the radio module 22 from the microcontroller 25. Then they are extracted by the RTC 256 of the radio module 22. The cycle frequency, with which the GPS receiver 23 may pass position data to the radio module 22, is defined. Furthermore, the operation times of the GPS receiver 23 are synchronized to those of the radio module 22 in order to reduce the current consumption of the system 20.

An Assisted GPS application executed in the radio module 22 sends to the GPS receiver 23 GPS assistance information that the radio module 22 has received from a cellular network. The GPS positioning results received by the radio module 22 from the GPS receiver 23 are first buffered and then transferred to the microcontroller 25. Preferably, the GPS positioning results are given to the microcontroller 25 as an answer to an AT command.

FIG. 3 discloses another exemplary embodiment that modifies systems 20 and 200 shown in FIG. 2.

Under the embodiment, an interface is provided between radio module 32 and the GPS receiver 33. The radio frequency part 135 of the GPS receiver 33 is now directly controlled by the base band unit 323 of the radio module 32. Program code performing the functions of the program code of the GPS base band unit 133 is executed in the base band 323 of the radio module 32. In this manner, there is no need for a separate GPS base band unit 133. Furthermore, ROM and RAM of the GPS receiver 33 can be omitted. The Real Time Clock 156 of the microcontroller 156 may also be omitted.

The principles underlying the present disclosure can be used for systems comprising other kinds of radio modules than those for GSM. For example, radio modules for communication with a CDMA or WLAN network are also possible either alone or in combination with each other or GSM.

In the example above, the Global Positioning System (GPS) was used as an example of a satellite positioning system. The invention is nevertheless not limited to the GPS system but can be used with any other satellite positioning system instead of or in addition to the GPS system. The planned European Galileo navigation system is a further example of a suitable satellite positioning system.

Moreover, instead of using a GPS receiver, another satellite positioning system receiver can be used. Also, in the context of such another satellite positioning system, instead of or in addition to a network-assisted GPS functionality a network-assisted satellite positioning functionality can be used.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention is claimed as follows:

1. An arrangement, comprising:
   a sub-system comprising a satellite positioning system receiver (SPSR) and a radio module, wherein the radio module is communicatively connected to an external interface of the sub-system, and further communicatively directly connected to the SPSR via an internal interface of the sub-system,
   a microcontroller external to said sub-system and communicatively only connected to the sub-system via the external interface of the sub-system;
   wherein
      the SPSR communicates with the radio module via the internal interface,
      the radio module passes at least part of the communication from the SPSR to the external interface, and wherein communication received from the external interface to the radio module is transmitted to the SPSR via the internal interface,
   and wherein the radio module comprises a processing unit that controls the radio module using a first subset of commands received from the external interface, and controls the SPSR using a second subset of commands received from the external interface, wherein the first and second subsets have a common format.

2. The arrangement according to claim 1, wherein the commands are AT commands.

3. The arrangement according to claim 1, wherein the sub-system further comprises a real time clock operatively coupled to the radio module and the SPSR.

4. The arrangement according to claim 1, wherein the processing unit synchronizes the activation of the SPSR with the radio module.

5. The arrangement according to claim 1, wherein the processing unit synchronizes the setting of the SPSR and the radio module to a standby state.

6. The arrangement according to claim 1, wherein the processing unit transmits or receives communication to or from a cellular network.

7. The arrangement according to claim 6, wherein the cellular network is a cellular network supporting GSM on at least one of the following frequency bands: GSM 850 MHz, GSM 900 MHz, GSM 1800 MHz, and GSM 1900 MHz.

8. The arrangement according to claim 1, wherein the SPSR is a GPS receiver.

9. The arrangement according to claim 1, wherein the SPSR is a Galileo-system.

10. A method for transmitting data in an arrangement utilizing microcontroller, comprising the steps of transmitting data from a satellite positioning system receiver (SPSR) in a sub-system to a radio module in the sub-system via an internal interface;

passing at least part of the data from the SPSR to an external interface of the sub-system via the radio module;

passing data from the external interface to the radio module and to the SPSR via the internal interface, controlling the radio module using a processing unit located in the radio module, wherein the step of controlling the radio module is done by a first subset of commands received from the external interface; and controlling the SPSR using the processing unit, wherein the step of controlling the SPSR is done by a second subset of commands received from the external interface, and wherein the first and second subsets have a common format.

11. The method according to claim 10, wherein the commands are AT commands.

12. The method according to claim 10, further comprising the step of synchronizing the activation of the SPSR with the radio module via the processing unit.

13. The method according to claim 10, further comprising the step of synchronizing the setting of the SPSR and the radio module to a standby state via the processing unit.

14. The method according to claim 10, wherein the SPSR is a GPS receiver.

15. The method according to claim 10, wherein the SPSR is a Galileo-system.

16. A system, comprising:

a device comprising a satellite positioning system receiver (SPSR) having a first wireless interface and a radio module having a second wireless interface, wherein the radio module further comprises a first and second interface, and the SPSR further comprises a third interface connected with the second interface, a microcontroller external to said device and communicatively connected to the device via the first interface;

wherein the SPSR communicates with the radio module via the second and third interfaces, the radio module passes at least part of the communication from the SPSR to the first interface, and wherein communication received from the first interface to the radio module is transmitted to the SPSR via the second and third interfaces, and wherein the radio module comprises a processing unit that controls the radio module using a first subset of commands received from the first interface, and controls the SPSR using a second subset of commands received from the first interface, wherein the first and second subsets have a common format.

17. The system according to claim 16, wherein the system further comprises a real time clock operatively coupled to the radio module and the SPSR.

18. The system according to claim 16, wherein the processing unit synchronizes the activation of the SPSR with the radio module.

19. The system according to claim 16, wherein the processing unit synchronizes the setting of the SPSR and the radio module to a standby state.

20. The system according to claim 16, wherein the processing unit transmits or receives communication to or from a cellular network.

* * * * *